(12) United States Patent
Zheng

(10) Patent No.: US 11,878,644 B2
(45) Date of Patent: Jan. 23, 2024

(54) COLLISION AVOIDANCE DEVICE

(71) Applicant: Tianyi Zheng, Dallas, TX (US)

(72) Inventor: Tianyi Zheng, Dallas, TX (US)

( * ) Notice: Subject to any disclaimer, the term of this patent is extended or adjusted under 35 U.S.C. 154(b) by 155 days.

(21) Appl. No.: 17/324,729

(22) Filed: May 19, 2021

(65) Prior Publication Data

US 2022/0371534 A1 Nov. 24, 2022

(51) Int. Cl.
*B60R 21/0134* (2006.01)
*B60W 30/08* (2012.01)
*B60Q 1/50* (2006.01)
*B60R 21/00* (2006.01)

(52) U.S. Cl.
CPC .......... *B60R 21/0134* (2013.01); *B60Q 1/535* (2022.05); *B60W 30/08* (2013.01); *B60R 2021/0027* (2013.01); *B60W 2420/42* (2013.01); *B60W 2420/52* (2013.01); *B60W 2554/80* (2020.02)

(58) Field of Classification Search
CPC ........ B60R 21/0134; B60R 2021/0027; B60Q 1/525; B60W 30/08; B60W 2420/42; B60W 2420/52; B60W 2554/80; B60W 30/095; B60W 30/16
See application file for complete search history.

(56) References Cited

U.S. PATENT DOCUMENTS

| 5,838,228 A | * | 11/1998 | Clark | B60Q 1/535 340/463 |
| 2013/0057398 A1 | * | 3/2013 | Wen | B60Q 1/525 340/435 |
| 2018/0222387 A1 | * | 8/2018 | Wu | B60R 13/10 |

* cited by examiner

*Primary Examiner* — Daryl C Pope
(74) *Attorney, Agent, or Firm* — Timothy T. Wang; Ni, Wang & Massand, PLLC

(57) ABSTRACT

A collision avoidance device, includes a license plate frame, a first sensor mounted to the license plate frame to determine a distance of a following vehicle to the license plate frame and a second sensor mounted to the license plate frame to determine a velocity of the license plate frame, a logic circuit electrically coupled to the first sensor and the second sensor, wherein the logic circuit, determines a safe trailing distance between the license plate frame and the following vehicle based upon the velocity of the license plate frame and determines whether the following vehicle is closer than the safe trailing distance to the license plate frame and a warning light is coupled to the license plate frame to illuminate the license plate frame if the following vehicle is closer than the safe trailing distance.

16 Claims, 4 Drawing Sheets

COLLISION AVOIDANCE DEVICE

BACKGROUND

Technical Field

The instant disclosure is related to an automotive safety device and more specifically to a collision avoidance device.

Background

Currently, collision avoidance devices internally inform the driver of a vehicle that he is following another vehicle too closely.

SUMMARY

In one embodiment, a collision avoidance device, includes a license plate frame, a first sensor mounted to the license plate frame to determine a distance of a following vehicle to the license plate frame and a second sensor mounted to the license plate frame to determine a velocity of the license plate frame, a logic circuit electrically coupled to the first sensor and the second sensor, wherein the logic circuit, determines a safe trailing distance between the license plate frame and the following vehicle based upon the velocity of the license plate frame and determines whether the following vehicle is closer than the safe trailing distance to the license plate frame and a warning light is coupled to the license plate frame to illuminate the license plate frame if the following vehicle is closer than the safe trailing distance.

In another embodiment, a collision avoidance device, includes a license plate frame configured to couple to a rear of a transport, a first sensor mounted to the license plate frame to determine a distance between a following vehicle and the transport and a second sensor mounted to the license plate frame to determine a velocity of the transport, a logic circuit electrically coupled to the first sensor and the second sensor, wherein the logic circuit, determines a safe trailing distance between the transport and the following vehicle based upon the velocity of the transport and determines whether the following vehicle is closer than the safe trailing distance to the transport, a warning light coupled to the license plate frame to illuminate the license plate frame if the following vehicle is closer than the safe trailing distance to the transport.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Figure 1:
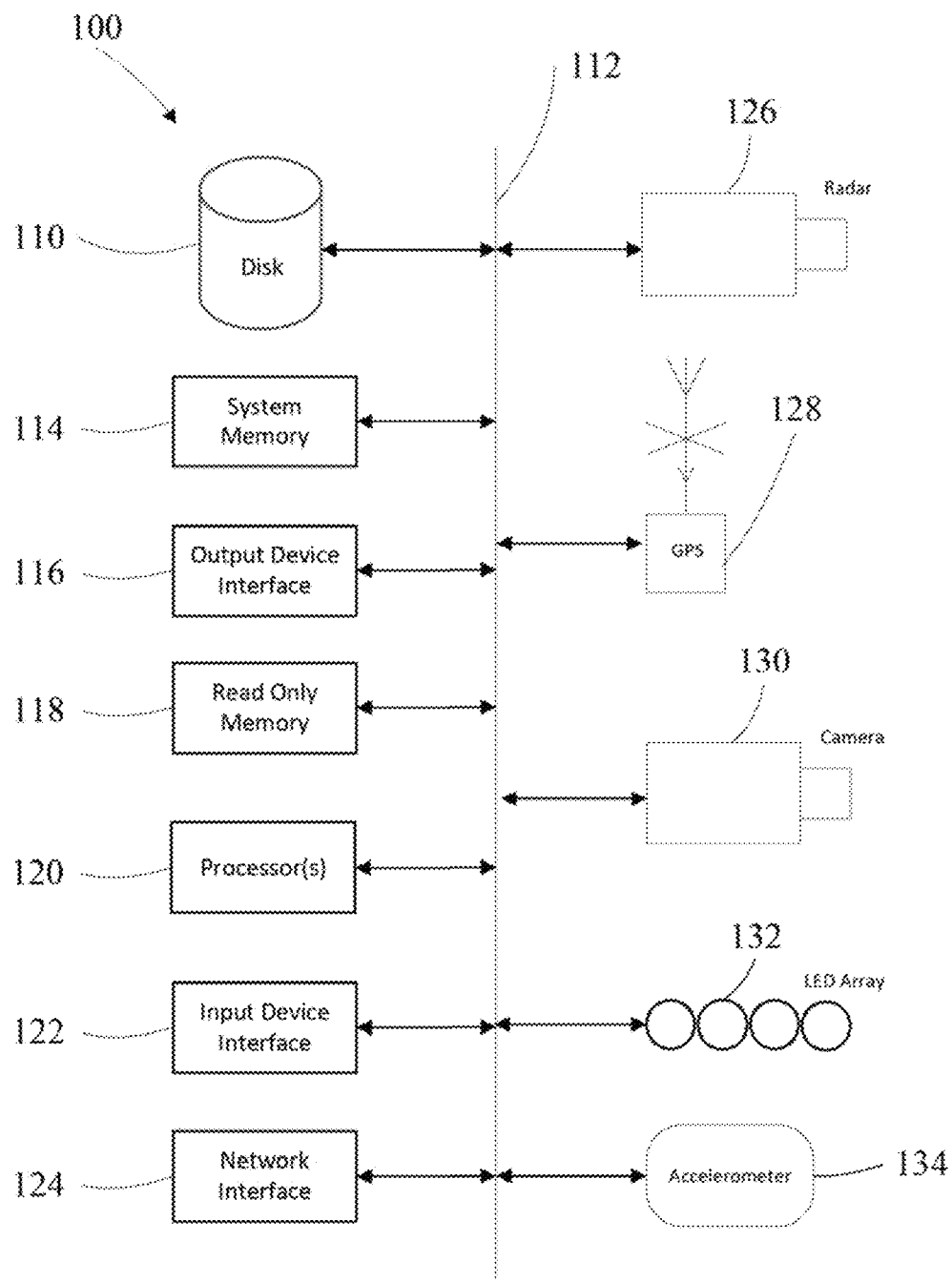
FIG. 1 is a system diagram in accordance with one embodiment of the disclosure.

FIG. 1 depicts an example electronic system for use in connection with a system having three cameras. Electronic system 100 may be a computing device for execution of software associated with the operation of one or more portions or steps of the flash process. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to a radar 126, a GPS 128, a camera 130, an LED array 132 and an accelerometer 134.

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, a radar 126, a GPS 128, a camera 130, an LED array 132 and an accelerometer 134.

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or WiFi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data, communication, e.g., a communication network. Examples of communication networks include a local area network ("LAN") and a wide area network. ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

Figure 2:
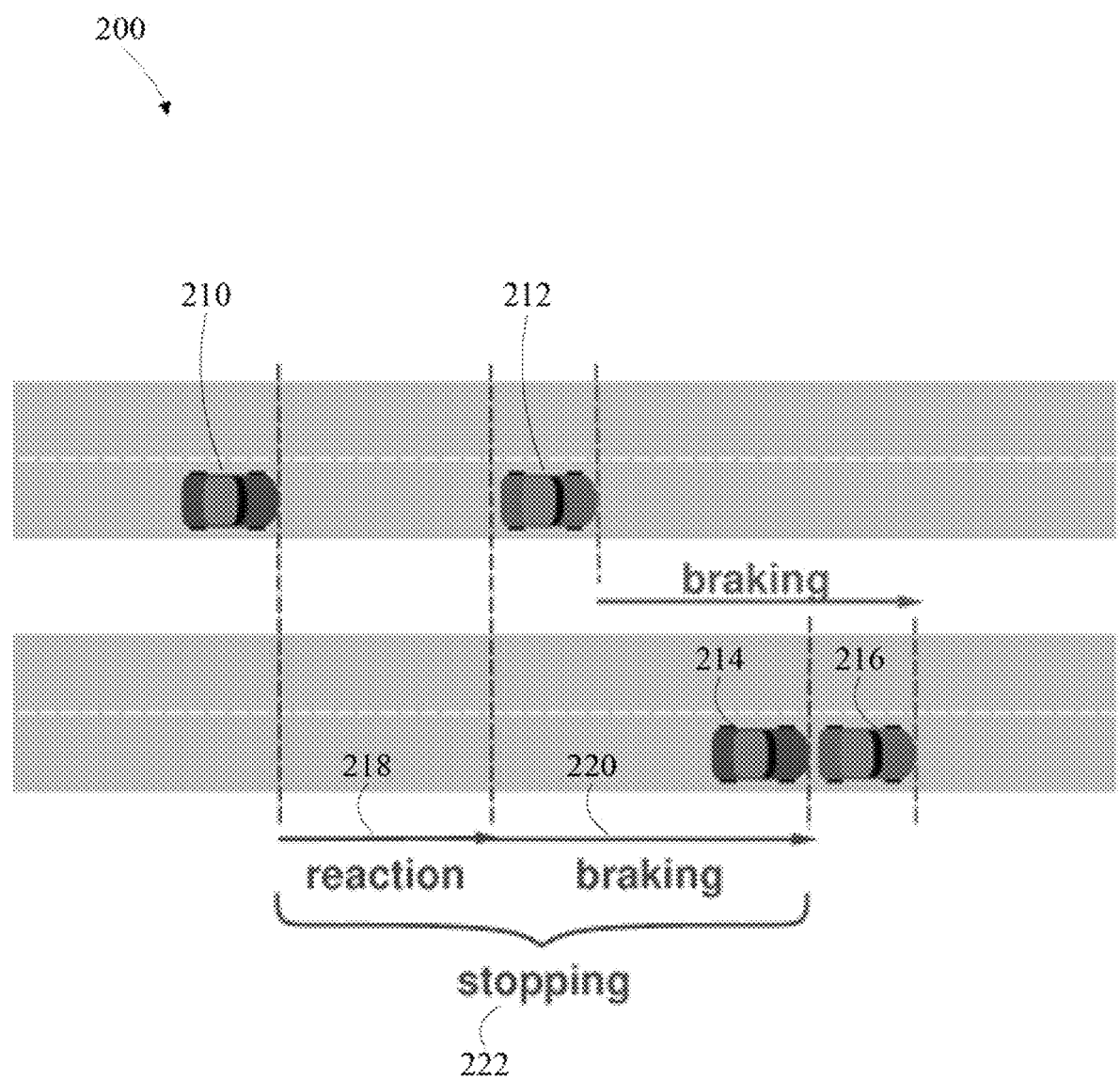
FIG. 2 depicts an example reaction and braking distance overview in accordance with one embodiment of the disclosure.

FIG. 2 depicts an example of reaction and braking distance. In this example a following vehicle 210 travels behind a transport 212 before a braking event, termed a reaction distance. After beginning braking, the following vehicle 214 is in close proximity to the transport 216. The reaction distance 218 precedes the braking distance 220 yielding a total stop distance 222. At a specific transport speed the total stop distance 222 may be evaluated as either being safe or unsafe. An unsafe inter-vehicle distance does not allow sufficient total stop distance and in the event of an unplanned heavy braking situation may result in a rear-end collision. The proposed system informs an external driver of entering a non-safe trailing distance behind a transport.

Figure 3:
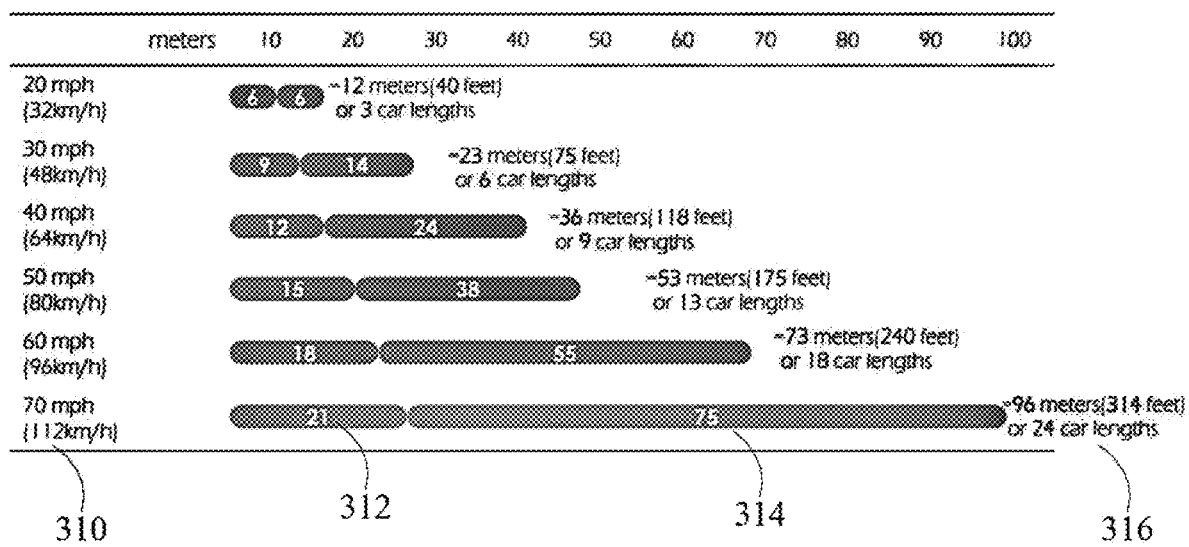
FIG. 3 depicts an example reaction and braking distance chart in accordance with one embodiment of the disclosure.

FIG. 3 depicts a reaction (thinking distance) 312 and a braking distance 314, 316 yielding a total stop distance for a specific velocity 310. This total stop distance versus transport velocity may be determined based on an equation, a look-up table and the like.

Figure 4:
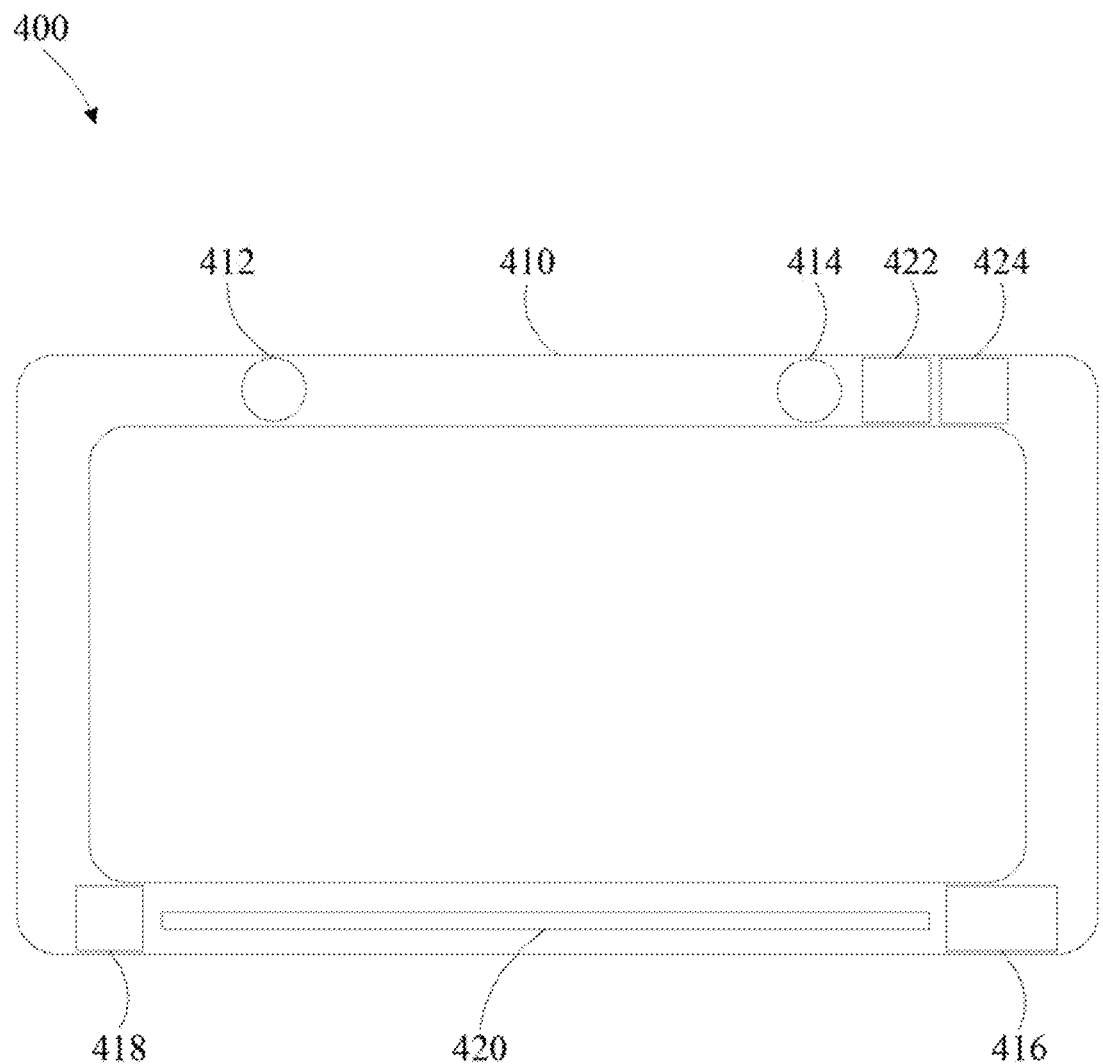
FIG. 4 depicts a collision avoidance device in accordance with one embodiment of the disclosure.

FIG. 4 depicts an example collision avoidance device 400, including a license plate frame 410 configured to be attached to the rear of a transport, a first sensor 412 mounted to the license plate frame 410 to determine a distance of a following vehicle to the license plate frame and a second sensor 416 mounted to the license plate frame to determine a velocity of the license plate frame. The system includes a logic circuit 418 electrically coupled to the first sensor 412 and the second sensor 416, wherein the logic circuit 418, determines a safe trailing distance between the license plate frame and the following vehicle based upon the velocity of the license plate frame and determines whether the following vehicle (FIG. 2, 210) is closer than the safe trailing distance to the license plate frame. The system includes a warning light 420 is coupled to the license plate frame to illuminate the license plate frame if the following vehicle (FIG. 2, 210) is closer than the safe trailing distance to the license plate frame. The illumination may be in the form or an LED string which may change color to red or begin blinking if the distance between the following vehicle and the transport is smaller than a safe trailing distance based on the speed of the transport to alert the following vehicle of the unsafe situation.

The first sensor may include one of radar to determine the distance between the transport and a following vehicle, sonar, a camera and/or a pair or cameras. The radar utilizes reflected radio frequency waves transmitted from the radar and received back at the radar to determine a distance between the rear of the transport and the following vehicle. Sonar utilizes reflected sound waves transmitted from the sonar and received back at the sonar to determine the distance. A camera may be utilized in visual odometry to determine the distance and the pair of cameras may be utilized via stereo to determine the distance.

The second sensor may be a global position system that may determine a location of the license plate frame and may include one of radar, sonar and a camera. The radar and or the sonar may through the use of the reflected signals be able to determine the speed of the transport. The camera may be able to utilize the centerline stripe to determine the speed of the transport.

The logic circuit may be a microprocessor, a microcontroller a field programmable gate array and the like.

The system may further comprise a camera (FIG. 4, 414) coupled to the license plate frame and a memory (FIG. 4, 422) coupled to the camera to record a video sequence. An accelerometer (FIG. 4, 424) coupled to the memory may signal a crash event and trigger a cessation of recording of a video sequence after the detection of an accelerometer signal indicative of the crash event.

Another example collision avoidance device, includes a license plate frame configured to couple to a rear of a transport, a first sensor mounted to the license plate frame to determine a distance between a following vehicle and the transport and a second sensor mounted to the license plate frame to determine a velocity of the transport. The system includes a logic circuit electrically coupled to the first sensor and the second sensor, wherein the logic circuit, determines a safe trailing distance between the transport and the following vehicle based upon the velocity of the transport and determines whether the following vehicle is closer than the safe trailing distance to the transport. The system includes a warning light coupled to the license plate frame to illuminate the license plate frame if the following vehicle is closer than the safe trailing distance to the transport to alert the following vehicle of the unsafe situation.

The first sensor may include one of radar, sonar, a camera and/or a pair or cameras. The second sensor may be a global position system that may determine a location of the license plate frame and may include one of radar, sonar and a camera. The logic circuit may be a microprocessor. The system may further comprise a camera coupled to the license plate frame and a memory coupled to the memory to record a video sequence and an accelerometer coupled to the memory to cease recording of the video sequence after detection of an accelerometer signal indicative of a crash event.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A collision avoidance device, comprising:
   a license plate frame;
   a first sensor mounted to the license plate frame to determine a distance of a following vehicle to the license plate frame;
   a second sensor mounted to the license plate frame to determine a velocity of the license plate frame;
   a logic circuit electrically coupled to the first sensor and the second sensor, wherein the logic circuit,
      determines a safe trailing distance between the license plate frame and the following vehicle based upon the velocity of the license plate frame, and
      determines whether the following vehicle is closer than the safe trailing distance to the license plate frame;
   a warning light coupled to the license plate frame to illuminate the license plate frame if the following vehicle is closer than the safe trailing distance; and
   a camera coupled to the license plate frame and a memory coupled to the camera to record a video sequence;
   an accelerometer coupled to the memory to terminate the video sequence after detection of an accelerometer signal indicative of a crash event.

2. The collision avoidance device of claim 1 wherein the first sensor is a radar.

3. The collision avoidance device of claim 1 wherein the first sensor is at least one of a sonar, a camera, and a pair of cameras.

4. The collision avoidance device of claim 1 wherein the second sensor is a global position system.

5. The collision avoidance device of claim 1 wherein the second sensor determines a location of the license plate frame.

6. The collision avoidance device of claim 1 wherein the second sensor is at least one of a radar, a sonar, and a camera.

7. The collision avoidance device of claim 1 wherein the logic circuit comprises at least one of a microprocessor and a microcontroller.

8. A collision avoidance device, comprising:
   a license plate frame configured to couple to a rear of a transport;
   a first sensor mounted to the license plate frame to determine a distance between a following vehicle and the transport;
   a second sensor mounted to the license plate frame to determine a velocity of the transport;
   a logic circuit electrically coupled to the first sensor and the second sensor, wherein the logic circuit,
      determines a safe trailing distance between the transport and the following vehicle based upon the velocity of the transport, and
      determines whether the following vehicle is closer than the safe trailing distance to the transport;
   a warning light coupled to the license plate frame to illuminate the license plate frame if the following vehicle is closer than the safe trailing distance to the transport; and
   a camera coupled to the license plate frame and a memory coupled to the camera to record a video sequence;
   an accelerometer coupled to the memory to terminate the video sequence after detection of an accelerometer signal indicative of a crash event.

9. The collision avoidance device of claim 8 wherein the first sensor is a radar.

10. The collision avoidance device of claim 8 wherein the first sensor is at least one of a sonar, a camera, and a pair of cameras.

11. The collision avoidance device of claim 8 wherein the second sensor is a global position system.

12. The collision avoidance device of claim 8 wherein the second sensor determines a location of the license plate frame.

13. The collision avoidance device of claim 8 wherein the second sensor is at least one of a radar, a sonar, and a camera.

14. The collision avoidance device of claim 8 wherein the logic circuit comprises at least one of a microprocessor and a microcontroller.

15. The collision avoidance device of claim 1, wherein determining the safe trailing distance includes a reaction distance and a breaking distance.

16. The collision avoidance device of claim 8, wherein determining the safe trailing distance includes a reaction distance and a breaking distance.

* * * * *